Fig.1

INVENTOR.
CLETUS L. MOORMAN

July 11, 1967   C. L. MOORMAN   3,330,439
PLASTIC FUEL TANK STRUCTURE
Filed July 17, 1964   10 Sheets-Sheet 4

INVENTOR.
CLETUS L. MOORMAN
BY
Albert N. Reuther
ATTORNEY

July 11, 1967 C. L. MOORMAN 3,330,439
PLASTIC FUEL TANK STRUCTURE
Filed July 17, 1964 10 Sheets-Sheet 6

Fig.8

INVENTOR.
CLETUS L. MOORMAN
BY
Albert H. Reuther
ATTORNEY

July 11, 1967  C. L. MOORMAN  3,330,439
FLASTIC FUEL TANK STRUCTURE
Filed July 17, 1964  10 Sheets-Sheet 9

INVENTOR.
CLETUS L. MOORMAN
BY
ATTORNEY

July 11, 1967

C. L. MOORMAN

3,330,439

FLASTIC FUEL TANK STRUCTURE

Filed July 17, 1964

INVENTOR.
CLETUS L. MOORMAN
BY
*Albert N. Reuther*
ATTORNEY

United States Patent Office 3,330,439
Patented July 11, 1967

3,330,439
PLASTIC FUEL TANK STRUCTURE
Cletus L. Moorman, Trotwood, Ohio, assignor to General Motors Corporation, Detroit, Mich., a corporation of Delaware
Filed July 17, 1964, Ser. No. 383,384
3 Claims. (Cl. 220—86)

This invention relates to fuel storage means, and, more particularly, to structures thereof adapted for insulating material use as well as reduction of noise, costly parts and assembly effort.

Trends in vehicle construction are toward use of lower bodies with minimum loss of body space so that less room is available for metal fuel tank structures. Also some vehicles can be provided with a front wheel drive or rear engine compartment requiring relocation of fuel tank structures accompanied by space and material considerations met in accordance with the present invention.

An object of the present invention is to provide a blow-molded high-density plastic fuel tank structure with a unitary body portion of only semirigid insulating material having filling and venting means therewith as well as gauge mounting in sealed relationship to eliminate many costly parts and simultaneously avoiding mold stresses.

Another object of this invention is to provide vehicle plastic fuel tank structure having a body portion of blow-molded high-density polyethylene material for semirigid wall portions and including a pair of substantially oppositely located inlet and outlet forming means as well as vent-forming means economically made with minimum of components to fit adjacent to a vehicle panel such as in a body, door and other support structure, the inlet forming means being completely integral including plural cam portions extending laterally outwardly for mating engagement of a cap or cover through the outlet forming means and vent-forming means are also all entirely integral of the same plastic material as the semirigid wall portions of tank structure having predetermined embossed areas for stability, locating support and/or venting, the outlet forming means having a lateral outwardly extending flare to receive a combined locking-ring cover-sealed gauge mounting independent of need for metal grounding to the wall portion.

Another object of this invention is to provide in combination a plastic fuel tank structure having inlet and outlet forming means at least one of which is fully integral therewith to include an outwardly flared neck having cam configuration outwardly thereon as well as an integral shoulder for positioning of a sealing ring against which a locking-ring gauge cover mounting fits free of need for electrical grounding through the plastic fuel tank structure.

A further object of this invention is to provide in combination a plastic tank structure having inlet and outlet forming means one of which is entirely of integral plastic material for cam-locking ring gauge-cover-feed-tube mounting and another of which has an inwardly extending shoulder to which an interference-fit end of an integral vent and filler tube means is sealingly mounted, the integral vent and filler tube means having a generally teardrop shaped portion of which opposite walls for a predetermined distance are directly adjacent to each other as an auxiliary vent area smaller than otherwise cylindrical filler tube area though entirely integral therewith.

Another object of this invention is to provide in combination a plastic fuel tank structure having a blow-molded main body portion including an integral outlet-forming means having outwardly flared edging that receives a cam-locking ring gauge-cover-feed-tube mounting and an integral inlet-forming means located axially opposite to the outlet-forming means though angularly offset to one side of the inlet-forming means which has restrictive passage vent means laterally integral therewith as well as a semiannular rib venting portion extending substantially longitudinally in alignment with the inlet forming means though also entirely integral with the plastic fuel tank structure.

Another object of the present invention is to provide a laminated plastic fuel tank liner structure having a low-permeability portion made of a long chain synthetic polymer material composed of at least 80 percent by weight of vinylidene chloride units and commonly known as Saran as well as urethane portion for flexibility and strength combined and adapted to fit into a space or cavity defined by body or panel components of a vehicle.

Another object of this invention is to provide a laminated plastic fuel tank liner structure having a relatively porous and flexible urethane wall portion laminated with low-permeability material exemplified by fluoride-containing plastic material as well as acetal resin material for puncture resisistance as made with a minimum of components to fit adjacent to a vehicle panel such as in a body, door and other support structure subject to optional provision of resilient wiring or internally disposed spring means to oppose collapse thereof due to emptying of fuel therefrom.

Further objects and advantages will be apparent from the following description, reference being made to the accompanying drawings wherein preferred embodiments of the present invention are clearly shown.

Figure 1:
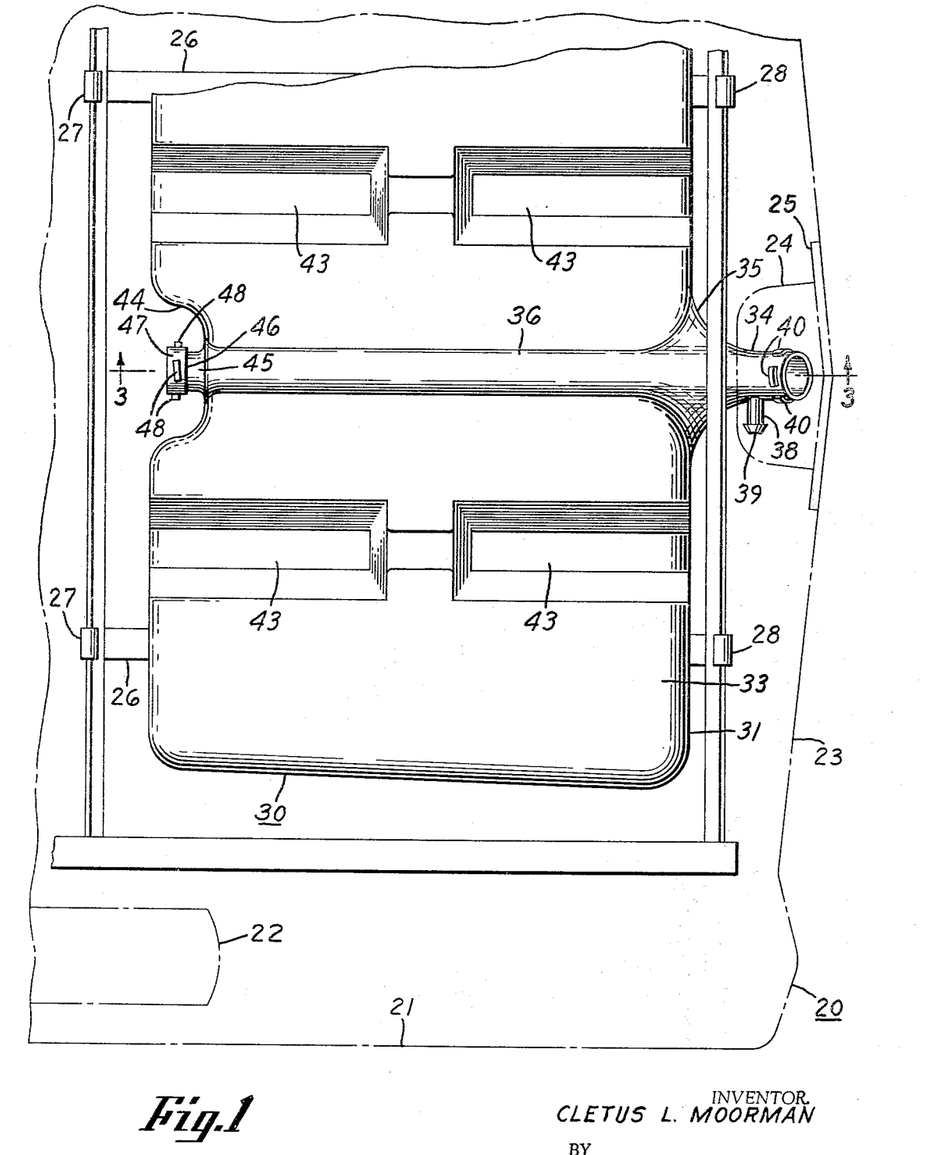
FIGURE 1 is a plan view of plastic fuel tank structure for vehicle use in accordance with the present invention.

In FIGURE 1 there is indicated a portion of a motor vehicle generally indicated by numeral 20 including a rear quarter panel or fender means 21 over and around a wheel 22 to one side of a compartment or storage portion 23. A recess forming portion 24 having a cover or rear entry door 25 suitably pivoted or journaled therewith can be provided adjacent to this storage area 23. A view of FIGURE 3 of the drawings also indicates such vehicle arrangement to include a bottom or floor portion to which mounting straps 26 can be secured by ends 27 and 28 thereof. Generally such mounting straps 26-27-28 are made of metal secured to a bottom or floor of the vehicle also of metal. Since such straps are tightly in engagement with a fuel storage container or gas tank means which also is tightly drawn against a metal underside of the floor or bottom, any stones or debris which may bounce against the fuel container or gas tank from the wheel 2 or otherwise will result in conveyance of noise through the gas tank if it is made of metal and then directly to the bottom or floor or by way of the metal tank to the straps secured to the vehicle body.

Also metal fuel storage containers or gas tanks as previously provided for motor vehicles have included a plurality of stampings and metal parts which have to be sweat soldered, welded and otherwise joined to each other to establish a sealed container or tank. Such metal containers or tanks are usually made of relatively thin metal to avoid excess weight and this can be punctured by flying rocks and the like. Thus FIGURES 1, 2 and 3 of the drawings show provision of a plastic fuel tank structure generally indicated by numeral 30 made entirely and unitarily of a semirigid insulating material exemplified by polyethylene. This semirigid plastic structural material can be blow-molded with a parting line in a horizontal plane subject to provision of a plastic cement or adhesive as well as a solvent such that opposite mating upper and lower portions of the plastic material can be fused into a unitary and integral structure as a fuel container or plastic gas tank. This plastic gas tank for under floor mounting thus will include a substantially squared or rectangular body portion 31 having rounded corners as well as a bottom 32 and a top or cover 33.

Figure 2:
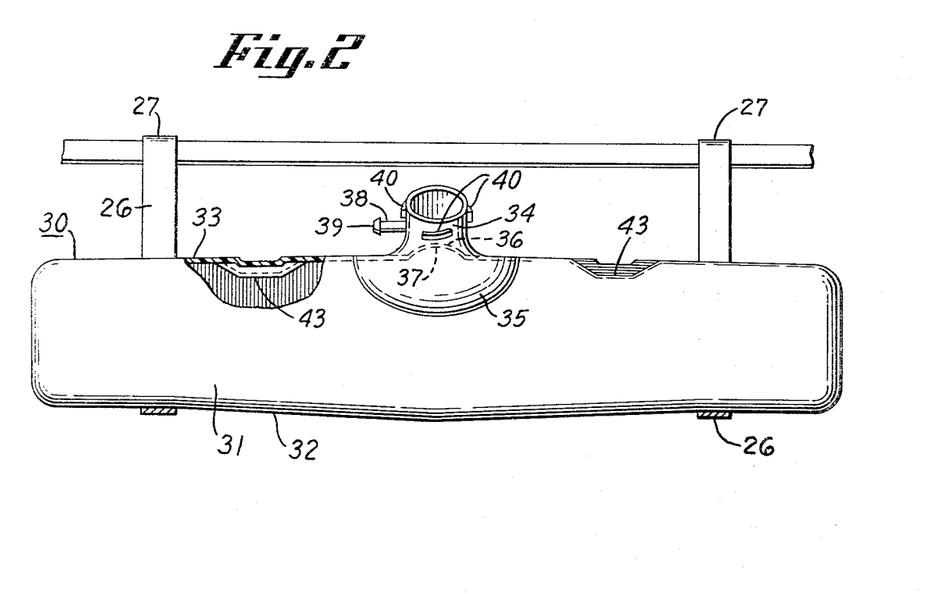
FIGURE 2 is an end view of the structure in FIGURE 1.
Figure 3:
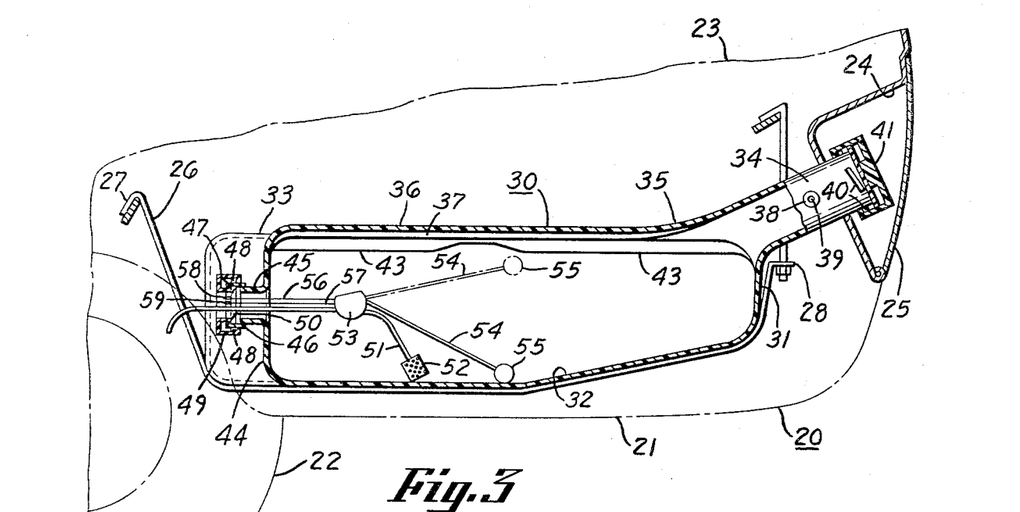
FIGURE 3 is a cross-sectional view taken along line 3—3 in FIGURE 1.

In accordance with the present invention various structral features of the fuel container or gas tank of plastic material are formed integrally with the wall portions 31-32-33 including an inlet forming means or filler neck portion 34 having a predetermined angular relationship as to the tank means per se and joined uniformly therewith by an integral curved portion 35. A raised or deformed embossment 36 extends substantially longitudinally of the inlet-forming means or filler neck 34 and this raised or embossed portion 36 extends integrally with the upper wall portion 33 forming a venting space or passage 37 thereunder. Also integral with the plastic filler neck portion or inlet forming means 34 there is a laterally extending projection 38 of moldable plastic material having an opening or passage 39 drilled or formed therein after molding. Location of this lateral projection or extension 38 for venting is slightly above the embossed portion 36 such that during fuel tank filling combustible fluid can be added readily to a full condition. Thus the lateral projection 38 is located substantially in alignment with an intersection of the integral embossed portion and inlet forming means or filler neck 34.

Also the inlet forming means or filler neck 34 has a plurality of laterally outwardly extending and equally-spaced flutes, flanges or cam means 40 adapted to mate with and be engaged by corresponding structure of a cover or cap 41 also made of moldable plastic material such as polyamide or nylon rather than metal. The moldable plastic materials of the filler neck portion as well as of the cap or cover 41 can mate in tight sealing engagement without absolute need for provision of any gasket or separate sealing strip along a juncture therebetween.

Suitable embossments or recesses 43 can be provided along the top wall portion to mate with locating supports of the vehicle bottom or floor. Longitudinally in alignment with the inlet forming portion or filler neck portion 34 and venting embossment 36 there is provided a recessing 44 and an outlet forming means or combination gauge or float mechanism and feed out mounting means 45 integral with the plastic moldable material of the fuel or gas tank means and including an outwardly flared or flanged shoulder portion 46 as well as an axial portion 47 having integral cam means or flute and flanged portions 48. Such cam means or flanges and flutes 48 extend laterally outwardly to be in mating engagement with an annular ring member 49 flared or flanged radially inwardly to engage a float mechanism base portion 50 held against the shoulder 46 as can be best seen in the view of FIGURE 3. Float mechanism per se other than the base portion 50 and annular ring means 49 can have structure substantially as well known to include a feed line or conduit 51 having a fuel filter means 52 at a free end thereof adjacent to upper surfacing of the bottom wall 32 of the plastic fuel tank means. Also an electrical resistance or rheostat housing structure 53 is provided together with a pivotal lever 54 having a float 55 on a free end thereof movable in accordance with liquid level in the fuel storage container or gas tank. Suitable electrical connection by wiring 56 and 57 to terminal means 58 and 59 respectively can be provided such that no grounding to any metal tank structure is required and suitable mating terminal means can be secured to the terminals 58–59 to connect a fuel indicator gauge thereto from inside a vehicle passenger compartment. The annular ring means 49 can also be made of polyamide or nylon material and a tight seal can be established by a limited turning movement thereof as to the cam or flange means 48 without need for any separate gasket for sealing and eliminating multiple parts of screws and cover plate arrangement previously used for installation of float mechanism subject to difficulty as to leakage and proper electrical connection. Since base portion 50 can also be made of moldable plastic material and the annular ring 49 and outlet forming means 45-46-47 are all made of insulating material there is eliminated a problem of insulating such wiring and electrical terminal means. Also, the location of the outlet-forming means along a vertical wall portion makes access to the float mechanism practical without need for removal of trim and floor covering material along top surfacing of the vehicle bottom or trunk storage compartment. Provision of all-plastic fuel tank structure results in deadening and reduction of noise due to rocks and the like hitting the insulating material tank while driving a vehicle.

Figure 4:
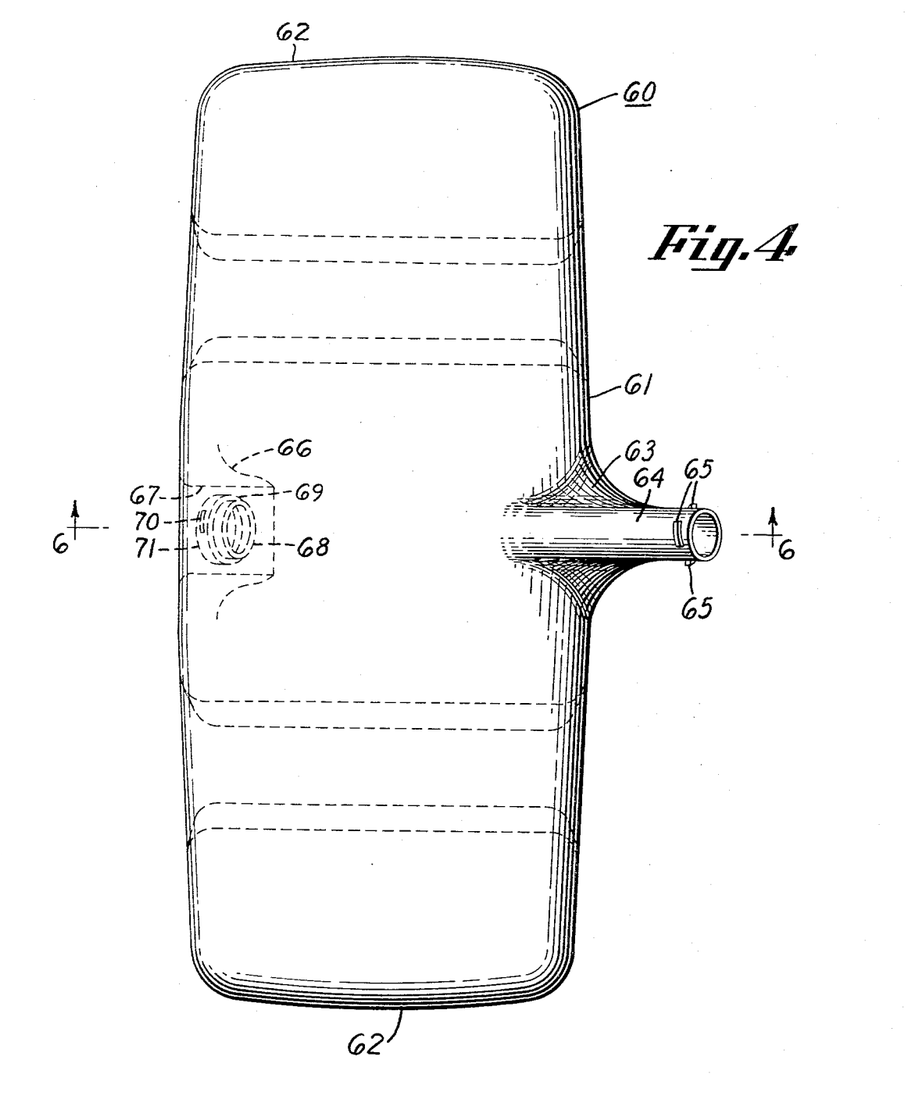
FIGURE 4 is a fragmentary plan view of another plastic fuel tank structure for vehicle use also having features in accordance with the present invention.
Figure 5:
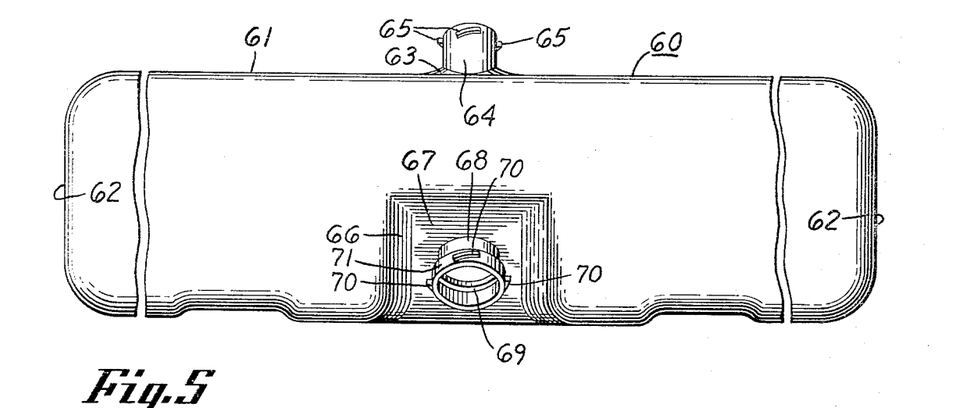
FIGURE 5 is a side view of the structure of FIGURE 4.
Figure 6:
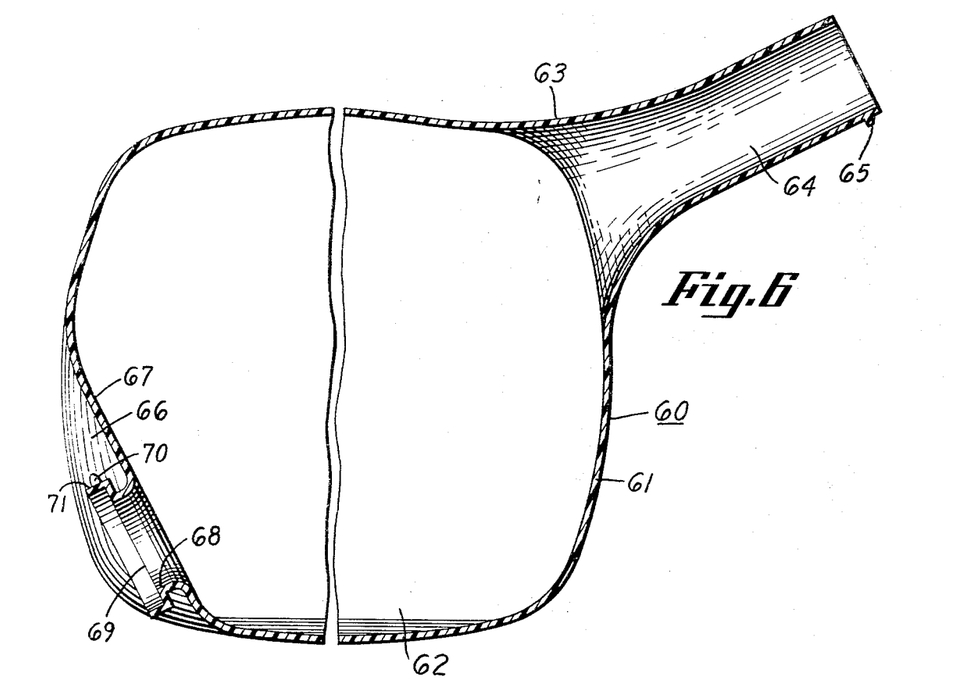
FIGURE 6 is a cross-sectional view taken along line 6—6 in FIGURE 4.

FIGURES 4, 5 and 6 illustrate further plastic fuel tank structure generally indicated by numeral 60 and incorporating features similar to those of FIGURES 1, 2 and 3 of the drawings. The fuel tank structure 60 can be used on vehicles such as light trucks as well as wagons or coaches wherein space available has greater width and less length than for the arrangement previously described. The plastic gas tank structure 60 includes a substantially squared or rectangular configuration with curved end wall 61 as well as opposite side walls 62. An integral curved filler structure 63 interconnects the end wall 61 with an inlet forming means or filler neck portion 64 having cam means or outwardly flared locking portions 65 all entirely of moldable plastic material exemplified by polyethylene. In a location substantially diametrically opposite from the inlet forming means or filler neck portion 64 there is recessing 66 and a platform or wall segment 67 including an outlet forming portion or neck 68 integral with a lateral flange or shoulder 69 for mounting of gauge mechanism in a manner similar to that illustrated in FIGURE 3. Cam means or outwardly extending flange portion 70 can be provided integrally with an axial annular wall portion 71 for sealing engagement by an annular ring having a mating cam structure internally thereof.

Figure 7:
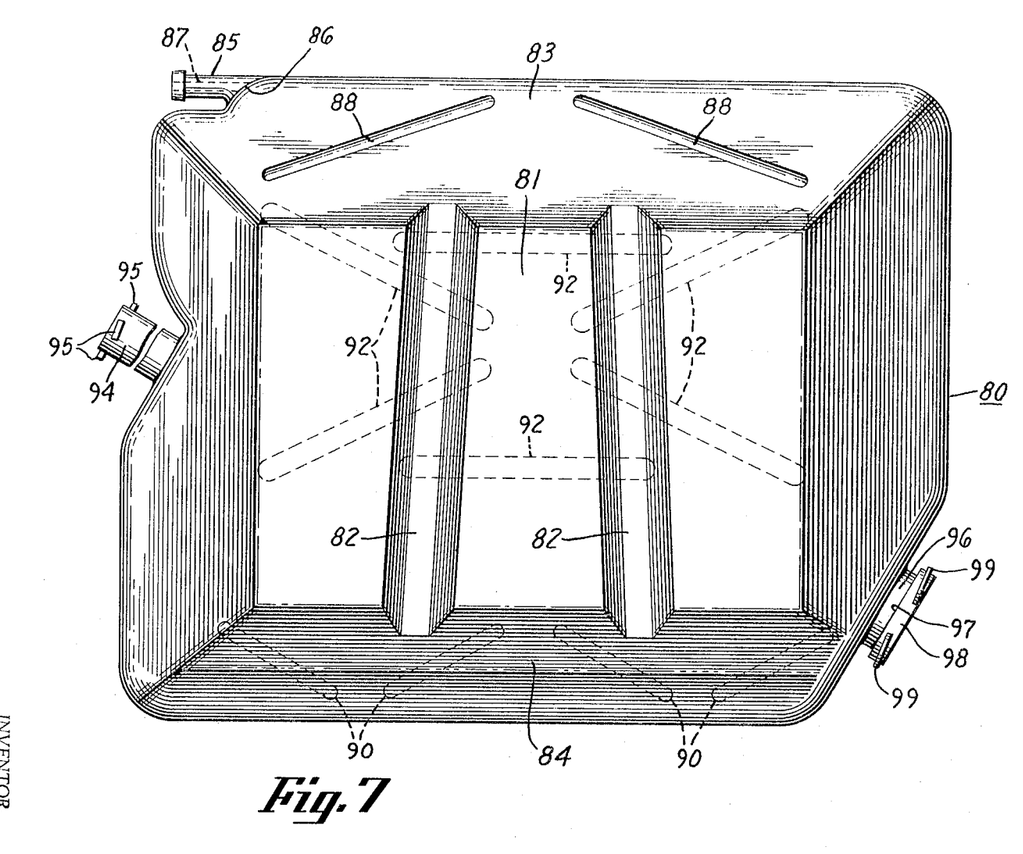
FIGURE 7 is a plan view of another embodiment of plastic fuel tank structure for vehicle use having features in accordance with the present invention.
Figure 8:
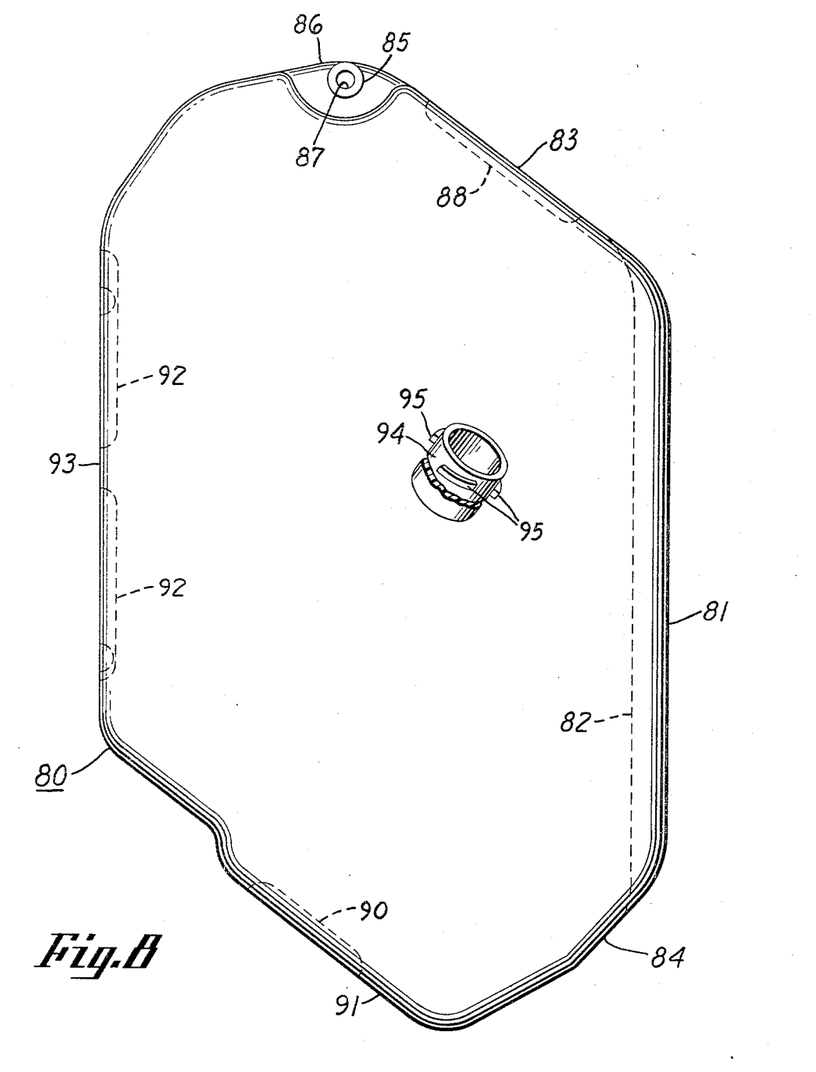
FIGURE 8 is an end view of the structure of FIGURE 7.

FIGURES 7 and 8 of the drawings illustrate plastic fuel tank structure generally indicated by numeral 80 including a parallelogram-shaped body portion so far as end to end configuration is concerned though having a substantially squared or rectangular configuration from a side as can be seen in the view of FIGURE 7. One sidewall 81 has a pair of locating support recesses 82 that extend in slightly offset directions though substantially vertically between an upper slanted wall portion 83 and a lower slanted wall portion 84. The upper slanted wall portion 83 has an integral plastic projection 85 extending longitudinally thereof along rounded upper cornering 86 and a suitable vent opening 87 can be bored or drilled into the projection 85 as indicated in views of FIGURES 7 and 8. The upper slanted wall portion 83 can have a pair of slanting recesses 88 located substantially symmetrically though diverging from each other for strengthening and reinforcing purposes as to the plastic wall configuration. Similar reinforcing recesses in a substantially zig-zag configuration and designated by reference numeral 90 can be provided in a wall portion 91 substantially parallel to the upper wall portion 83. Outwardly diverging embossments or recesses 92 can be provided in a wall port on 93 substantially parallel to and corresponding to wall portion 81. An inlet forming means 94 or neck portion can be provided integrally with the all plasitc tank structure and cam means or outwardly flared flange portions 95 are provided integrally therewith as shown in views of FIGURES 7 and 8. This inlet forming means is adapted to receive a plastic cap or cover portion sealingly mated with the cammed filler neck portion on one side or end of the plastic tank structure and in a location diametrically opposite there is an outlet forming means including a neck portion 96 integral with a shoulder portion 97 and axial portion 98 having cam means 99 thereon as described earlier. It was found that positioning of the vent projection or extension 85 in a location corresponding to the location of the inlet forming means 94 provides improved breathing and permits filling at a faster rate. It is to be noted that suitable gauge indicating mechanism can be installed as to the outlet forming means 96 and more particularly the cam means 99 thereof in a manner similar to that described for the structure of FIGURE 3

Figures 9, 10, 11:
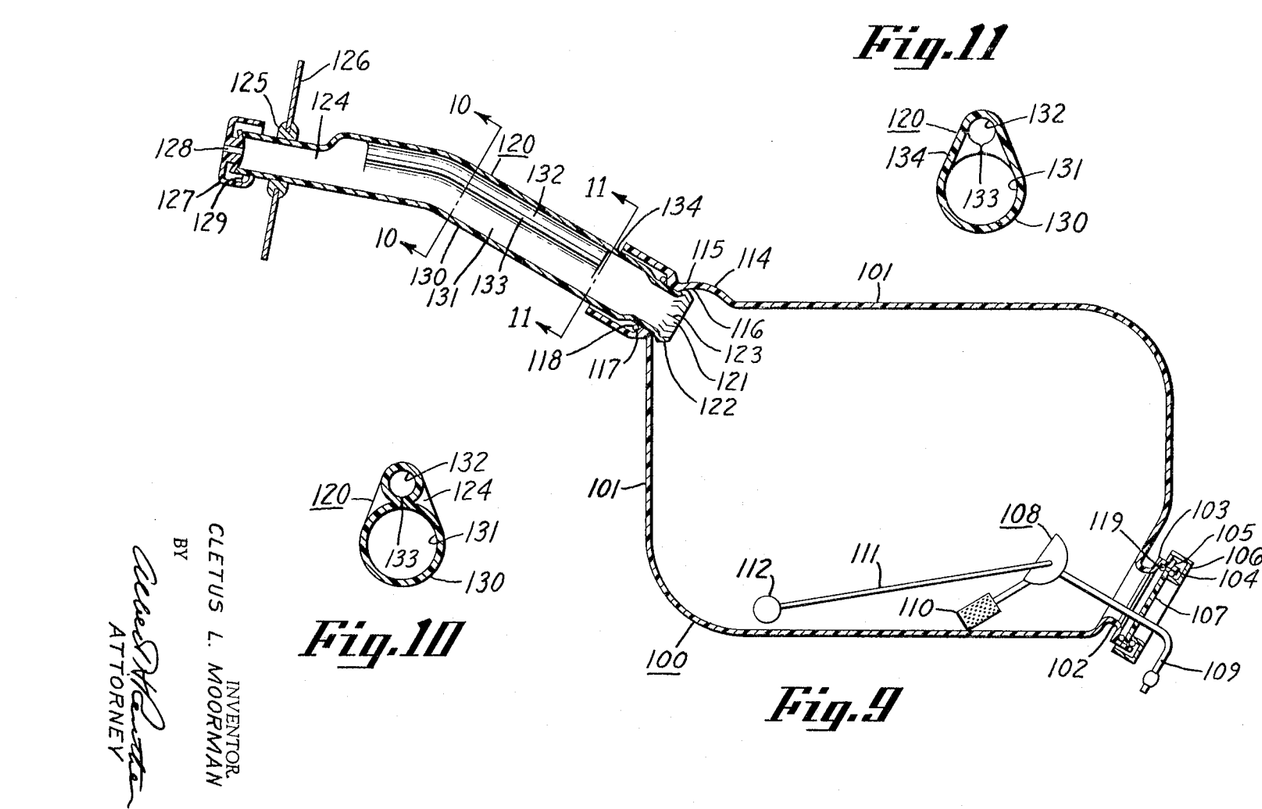
FIGURE 9 is a cross-sectional view of combination vent-filler tube means fitted to a plastic fuel tank structure for vehicle use including cam-locking ring gauge-cover-feed-tube mounting in accordance with the present invention.
FIGURE 10 is a cross-sectional view taken along line 10—10 in FIGURE 9.
FIGURE 11 is a cross-sectional view taken along line 11—11 in FIGURE 9.

On some installations of plastic fuel tank structures the inlet forming portion may have a modification to receive a separable combination vent and filler tube means integral as to each other per se though removable from the tank per se. Thus in FIGURE 9 of the drawings there is shown a substantially squared or rectangular plastic fuel tank means generally indicated by numeral 100 made of blow-moldable insulating material exemplified by polyethylene and including wall portions 101 as well as an outlet forming means 102 integral therewith. The outlet forming portion 102 can include a lateral flange or shoulder portion 103 as well as an axial end 104 having bayonet or cam means flanges 105 engaged by an annular locking ring 106 to hold a base 107 of a feed line and float assembly generally indicated by numeral 108. A tube or feed conduit 109 projects through the base 107 and has a filter 110 at one end thereof in a well known manner such that fuel can be removed from the plastic tank structure 100 through the outlet forming means 102. A pivotally journaled arm 111 having a float 112 along a free end thereof can have a rheostat or electrical resistance engaging end journaled with the assembly 108 in a well known manner. Located diametrically opposite from the outlet forming portion 102 there is an inlet forming portion 114 having an inward restriction 115 forming a lower peripheral annular surfacing 116 as well as an upper annular peripheral surfacing 117 as can be seen in FIGURE 9. A gasket or seal ring means 118 can be seated against the upper shoulder 117 and similarly a gasket 119 can be provided between the shoulder 103 and base 107 of the gauge assembly 108. A combination vent and filler tube means generally indicated by numeral 120 is provided with a lower end 121 with an outwardly flared portion 122 optionally including slots 123 therein. These slots 123 provide resilience for snap-fit or spring engagement of the outwardly flared portion 122 against the lower annular shoulder 116 of the inlet forming portion 114. The radially inwardly extending portion 115 is located substantially concentrically around the lower end portion 121 of the combination vent and filler tube means 120. An opposite cylindrical end 124 of the combination vent and filler tube means can be suitably fitted through a mounting escutcheon 125 of a vehicle body panel 126 such as a fender or quarter panel. A suitable filler cap or cover 127 having a vent opening 128 therein can be fitted by interengagement of cam means 129 integral with the cylindrical end portion 124 with a lower peripheral inwardly bent edging of the cap or cover means 127 which can also be made of plastic material. The combination vent and filler tube means can be made of plastic material throughout or of metal material throughout subject to formation of separately defined venting and filler tube portions at least centrally or along an intermediate portion of the combined vent and filler tube means 120.

The integral vent and filler tube means 120 has modified intermediate cross sections as represented in views of FIGURES 10 and 11. When made of plastic moldable material, the sidewalls of an intermediate portion indicated by numeral 130 have a substantially "figure eight" cross section or configuration including a first or main annular passage portion 131 as well as a second or auxiliary passage portion for venting designated by numeral 132 separated from each other by opposite inwardly extending V-shaped wall structure 133 as separation between the filler tube area or passage 131 and vent tube area or passage 132 respectively. A generally tear-drop shaped configuration 134 prevails at opposite ends of the intermediate portion and this tear-drop configuration can be correspondingly formed in the inlet forming portion 114 of the plastic gas tank structure. The tear drop configuration 134 is illustrated in FIGURE 11. When the combination vent and filler tube means is made of metal the same general configuration is provided and the V-shaped wall portions 133 can be swaged or deformed laterally toward each other. However, the formation of the combination vent and filler tube means 120 can be readily made with only a unitary plastic material including the cam means 129 as well as the vent and filler tube portions. The interfit of the tear-dropped portions permits some latitude of movement if required for proper alignment between the plastic gas tank means and the combination filler and vent tube means. It is to be noted further that the combination vent and filler tube means 120 with the slotted ends permits temporary collapse and rebound under interference fit conditions and this particular structural arrangement represented by views of FIGURES 9, 10 and 11 can be used on a motor vehicle having a rear engine drive and having a storage or luggage compartment located forwardly of the passenger compartment.

Figure 12:
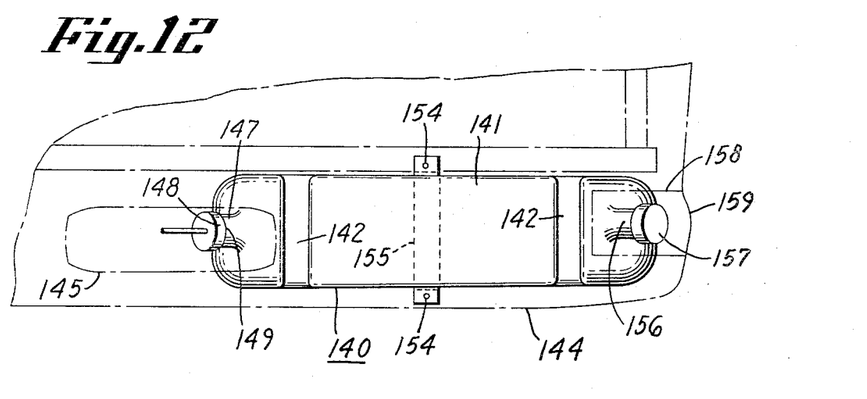
FIGURE 12 is a fragmentary top view of another plastic fuel tank structure for vehicle use in accordance with the present invention.
Figure 13:
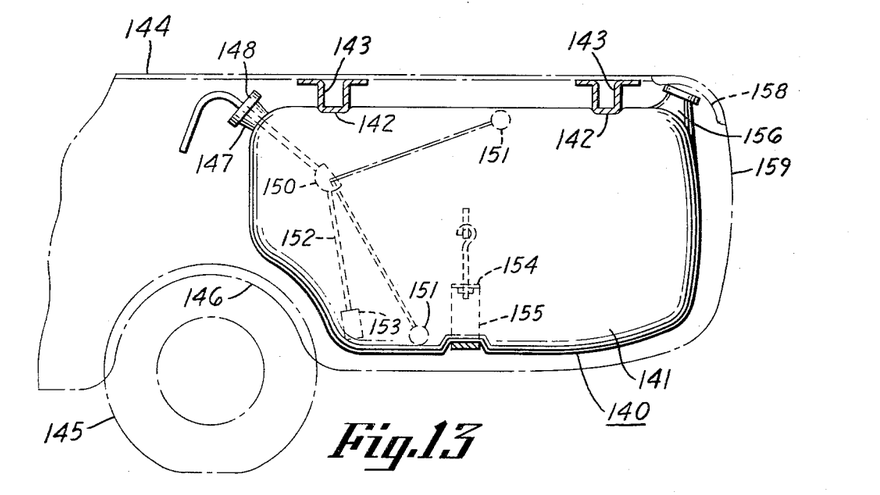
FIGURE 13 is an elevational view of the structure in FIGURE 12.

FIGURES 12 and 13 of the drawings illustrate installation of still another plastic fuel tank means generally indicated by numeral 140 also having a substantially rigid blow-molded polyethylene wall configuration 141 in a substantially rectangular or squared configuration. The wall portion configuration 141 can have a pair of recesses 142 along an upper surfacing thereof to mate and abut against locating supports 143 shown in FIGURE 13 and provided integrally with a vehicle body fender portion or rear quarter panel 144. A wheel 145 can be suitably journaled as to a vehicle body and a corresponding semi-annular recess 146 can be provided in the plastic wall portions of the gas tank structure 140 to be complementary to the wheel 145. An outlet forming means including a neck portion 147 can be provided integrally with the plastic gas tank structure in one upper corner thereof subject to provision of a laterally outwardly extending flange or shoulder 148 as well as cam means 149 to receive an annular ring complementary thereto for mounting a base of a liquid level gauge assembly generally indicated by numeral 150. This liquid level assembly 150 can include a float means 151 as well as a fuel feeder or outlet tube 152 having a filter 153 thereon. A saddle mounting strap fastening or bracket means 154 indicated in FIGURE 13 can be provided to extend underneath the plastic gas tank structure along a recess 155 thereof. An inlet forming means 156 can be provided integrally with the plastic gas tank structure as indicated in views of FIGURES 12 and 13. This inlet forming means can include plural cam or flange structures 157 completely integral with the plastic gas tank structure as described previously. It is to be noted that this inlet forming means 156–157 can be located adjacent to a recess 158 of a rear fender or body portion 159 of a motor vehicle. Location of the filler opening adjacent to the rear edge of the fender can permit provision of tail light assembly structure and/or other chrome or bright trim parts in conjunction with such rear assembly without need for any side access along the rear quarter panel or fender structure.

Figure 14:
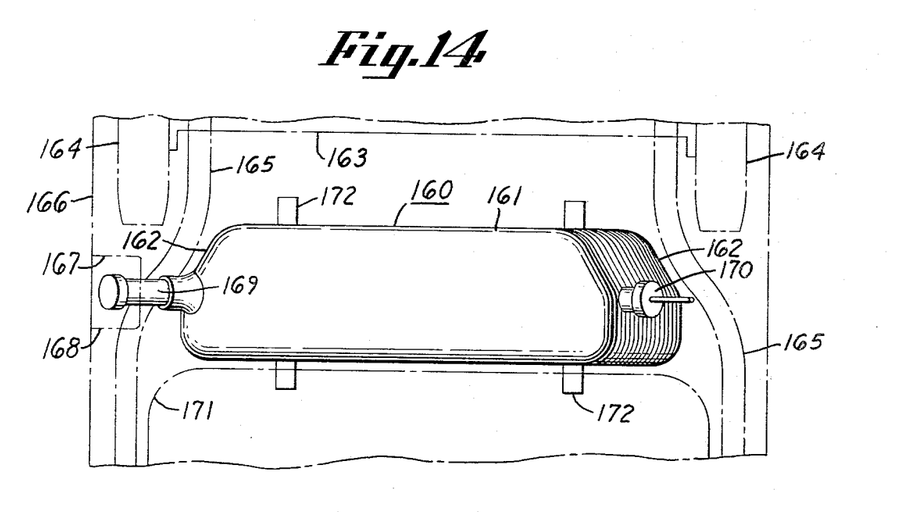
FIGURE 14 is a fragmentary top view of a further plastic fuel tank structure for vehicle use in accordance with the present invention.
Figure 15:
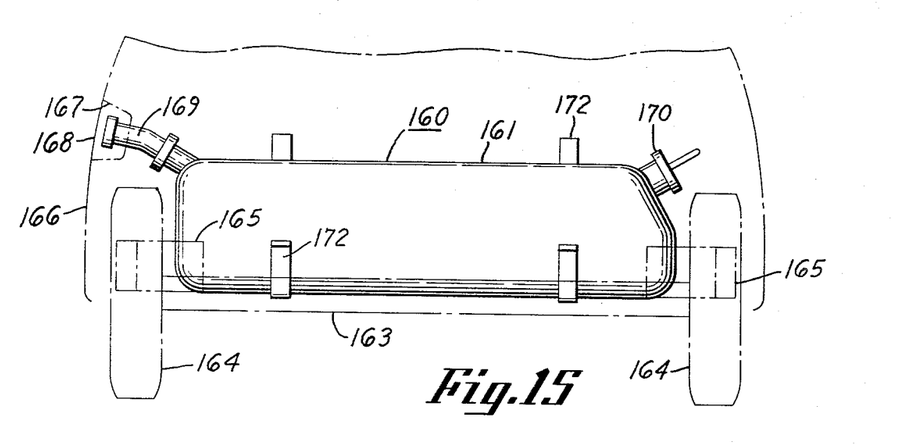
FIGURE 15 is an elevational view of the structure in FIGURE 14.

FIGURES 14 and 15 illustrate still another blow-molded plastic gas tank structure generally indicated by numeral 160 having a substantially squared wall configuration 161 including slanted or angularly disposed portions 162 which permit location of the plastic fuel tank means 160 to one side of an axle means 163 with which a wheel is journaled in a usual manner and is designated by a numeral 164. The slanted portions 162 are provided to permit mounting of the plastic gas tank means in a location also complementary to frame structure 165 on which a vehicle body means 166 is mounted in a well known manner. The vehicle body portion 166 can have a recess forming portion 167 therewith as well as a cover or side filler door means 168 and a combined filler-vent tube means 169 of a type disclosed in views of FIGURES 9, 10 and 11 can be provided with this plastic fuel tank structure. Similarly a gauge assembly 170 can be provided in a location opposite to that of the combined filler-vent tube means 169 as can be seen in views of FIGURES 14 and 15. The drawings in FIGURE 14 show location of the plastic fuel tank means intermediate the axle means 163 and a storage or luggage and trunk compartment 171. So far as safety and shielding of the plastic fuel tank structure is concerned the arrangement of FIGURES 14 and 15 is advantageous since the axle means 163 as well as the frame portion 165 and storage compartment 170 can avoid access to the plastic fuel tank means due to flying debris or rocks from all but an immediate underside of the plastic tank means. Suitable strap portions 172 can be provided to secure the plastic fuel tank and opposite ends of these straps can be secured to the vehicle body structure including the floor or underside and luggage storage compartment.

It is to be noted that the provision of an indicator-gauge assembly 170 can be made angularly as shown in FIGURES 14 and 15 though it is also possible for this gauge assembly to be mounted with an outlet forming means disposed vertically such that a linear fuel gauge means having structural detail similar to that of Patent 3,113,282, Coleman, issued December 3, 1963 and belonging to the assignee of the present invention can be used. It is to be noted however, that in any event when using a plastic fuel tank structure the outlet forming means is to have flanged shoulder and cam structure to receive a mating locking ring as well as a sealing gasket if necessary because the plastic gas or fuel tank means can thus be provided with integral plastic parts requiring less labor and cost for separate materials and components than previously encountered. The linear fuel gauge assembly of the patent noted also does not require use of electrical grounding through the tank means per se particularly since such grounding is not possible when the tank is not made of metal. A sliding float of plastic foam material can be provided together with other injection molded and extruded plastic parts except for electrical circuitry.

On certain vehicles there can be space available in locations adjacent to rocker panels, doors, and quarter panels wherein relatively rigid plastic tank means per se cannot be readily fitted. However, in such locations it is possible that a collapsable or resilient plastic fuel tank liner means generally indicated by numeral 174 in FIGURE 16 can be provided. Such plastic tank liner means 174 can include a plastic foam portion 175 of relatively porous material exemplified by urethane sheet having a surfacing of flexible though strong plastic material of low permeability exemplified by fluorine-containing resin such as tetrafluoroethylene or Teflon as well as acetal resin and plastic material made of a long chain synthetic polymer material composed of at least eighty percent by weight of vinylidene chloride units and commonly known as Saran. This surfacing layer of low permeability plastic material is indicated by a reference numeral 176 in FIGURE 16. A vehicle cavity 177 can be provided by body structure 178 having an access opening 179 thereto through which the flexible fuel tank liner means can be inserted and then inflated or expanded subsequent to insertion. Optional internal spring means 180 can have a coiled or zig zag configuration compressible temporarily during insertion through the opening though such added resilience from spring means is optional. The vehicle body portion 178 thus provides the main body support for the plastic fuel tank liner means.

Figure 16:
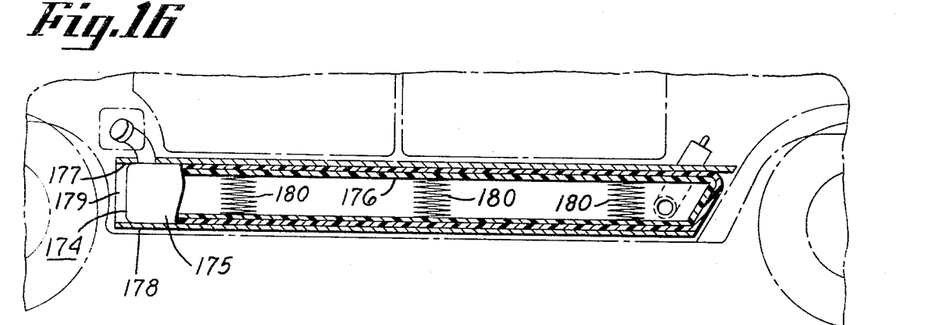
FIGURE 16 is a fragmentary sectioned view of resiliently maintained flexible-layered fuel tank liner means of another embodiment of plastic fuel containers in accordance with the present invention.
Figure 17:
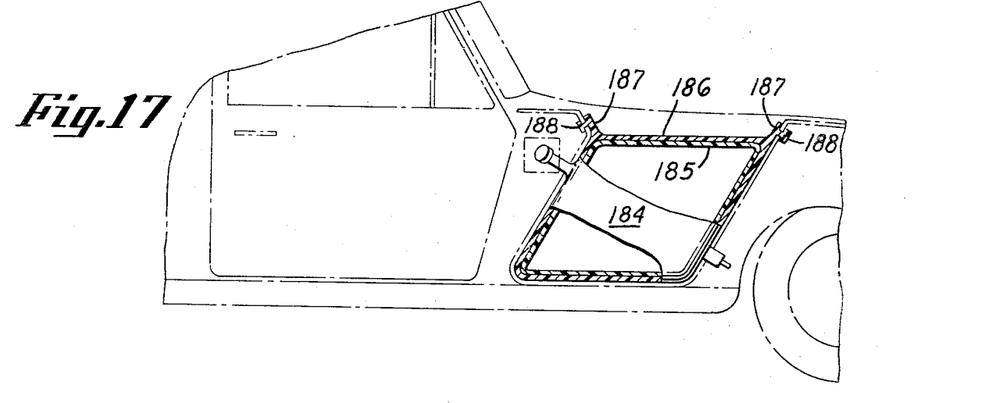
FIGURE 17 is a fragmentary sectioned view of another resiliently maintained flexible-layered fuel tank liner means embodiment of plastic fuel containers in accordance with the present invention.

FIGURE 16 shows the foam portion externally of the liner with the low permeability surfacing material internally thereof. FIGURE 17 illustrates that a plastic fuel tank liner means generally indicated by numeral 184 can also be provided to have foam or urethane material 185 located internally with low permeability plastic surfacing or covering 186 externally to include integral strap or mounting hangers 187 that can have integral plastic button or fastener portions 188 adapted to fit apertured vehicle body paneling for support of the plastic liner means adjacent thereto. It is to be understood that plural straps or hangers and buttons can be provided for such liner installation.

Figure 18:
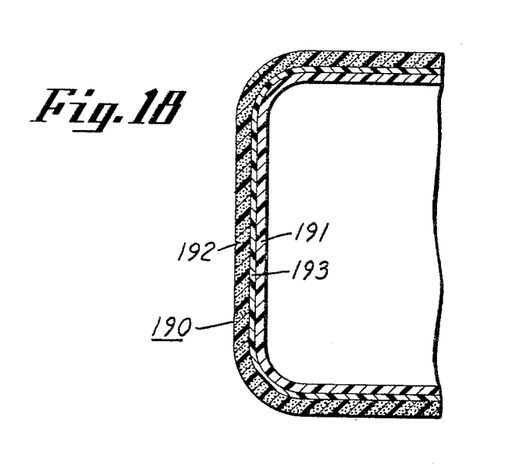
FIGURE 18 is a fragmentary sectioned view of a further embodiment of flexible multilayer fuel tank liner means of plastic fuel container structure in accordance with the present invention.

In FIGURE 18 there is shown another plastic fuel tank liner means generally indicated by numeral 190 including an intermediate or central plastic portion of low permeability material of Teflon, acetal resin or vinyl type material having a first or inner portion of urethane foam material 191 as well as a second or outer portion of urethane foam material 192 in a sandwich or laminated configuration therewith. The low permeability central portion is designated by a reference numeral 193 in FIGURE 18. The low permeability resin materials can be used for puncture resistance and for sealing purposes against leakage of fuel in liquid condition though the urethane foam portions add resilience and insulation against shock and rupture on at least one side of the low permeability and flexible plastic layer. A wall portion of such a collapsable plastic fuel tank liner means can be made relatively thin and suitable solvent materials for bonding of the plastic can be used for heat sealing of necessary flange inlet openings as to an apertured mounting space on a vehicle body. Also it is to be noted that more rigid reinforcing members could be embedded entirely within the plastic material for stiffening while retaining the advantage of a plastic fuel tank means or plastic fuel tank liner means so far as noise suppression and possible corrosion of previous metal tank structures is concerned. The low permeability plastic layering can be in a range between .0005 inch and .020 inch.

Use of plastic fuel tank structures in accordance with the present invention results in provision of insulating material throughout and at most a foam or plastic float can be provided to carry contacts as noted for a patent belonging to the assignee of the present invention as cited previously such that electrical contacts on the float remain submerged thus eliminating possibility of arcing in an explosive atmosphere.

While the embodiments of the invention herein disclosed constitute preferred forms, it is to be understood that other forms might be adopted.

What is claimed is as follows:

1. An all plastic fuel tank structure, comprising, a main body portion of blow-molded plastic material, an inlet forming means integral with said main body portion and having cam flanging integral therewith for cap mounting, an outlet forming means also having cam flanging integral therewith for feedline and float assembly mounting, an embossed vent-passage forming portion integral with said main body portion in a location longitudinally between said inlet-forming means and said outlet-forming means, and a lateral venting projection integral with said inlet forming means.

2. The structure of claim 1 wherein said venting projection is to one side of said vent-passage forming portion and said plastic material is entirely polyethylene.

3. In all plastic fuel tank structure comprising, a main body portion of blow-molded plastic material, an inlet forming means integral with said main body portion and having cam flanging integral therewith, an outlet forming means also having cam flanging integral therewith and an embossed vent-passage formed integral with said body portion at a location longitudinally between said inlet forming means and said outlet forming means.

References Cited
UNITED STATES PATENTS

| | | | |
|---|---|---|---|
| 1,849,950 | 3/1932 | Murdock | 222—479 |
| 2,731,093 | 1/1956 | Gordon | 150—.5 |
| 3,071,287 | 1/1963 | Gran | 220—86 |
| 3,077,284 | 2/1963 | McLaughlin | 220—72 |
| 3,129,014 | 4/1964 | Hutchison et al. | 150—.5 |
| 3,171,573 | 3/1965 | Berney | 220—72 |
| 3,187,936 | 6/1965 | Downing | 220—86 |
| 3,189,072 | 6/1965 | Starr | 220—39 |
| 3,244,148 | 4/1966 | Long | 150—.5 |

THERON E. CONDON, *Primary Examiner.*

JAMES R. GARRETT, *Examiner.*